United States Patent [19]

Atia et al.

[11] 4,293,945
[45] Oct. 6, 1981

[54] MULTICHANNEL CORRELATION RECEIVER FOR DETERMINING DEPOLARIZATION OF SIGNALS ALONG SIGNAL PROPAGATION PATHS

[75] Inventors: Ali E. E. Atia, Gaithersburg; Arnold L. Berman, Kensington, both of Md.; Christoph Mahle, Washington, D.C.

[73] Assignee: Communications Satellite Corporation, Washington, D.C.

[21] Appl. No.: 70,554

[22] Filed: Aug. 29, 1979

[51] Int. Cl.³ .......................... H04B 7/10; H04J 11/00
[52] U.S. Cl. ........................................ 370/17; 455/67; 343/100 PE
[58] Field of Search ....................... 370/17, 13, 19, 69, 370/18; 179/175.3 R; 455/67, 63, 60; 343/100 PE; 371/22

[56] References Cited

U.S. PATENT DOCUMENTS

| | | | |
|---|---|---|---|
| 3,360,729 | 12/1967 | Palatinus | 370/13 |
| 3,500,207 | 3/1970 | Ruthroff . | |
| 3,518,680 | 6/1970 | McAuliffe . | |
| 3,735,266 | 5/1973 | Amitay . | |
| 3,760,274 | 9/1973 | Vogt | 455/60 |
| 3,883,872 | 5/1975 | Fletcher et al. . | |
| 3,914,764 | 10/1975 | Ohm . | |
| 3,943,517 | 3/1976 | Vogt . | |
| 3,986,123 | 10/1976 | Tirro et al. . | |
| 4,090,137 | 5/1978 | Soma et al. . | |
| 4,106,015 | 8/1978 | Beguin et al. . | |
| 4,107,678 | 8/1978 | Powell . | |
| 4,146,893 | 3/1979 | Inagaki et al. | 455/63 |

*Primary Examiner*—Douglas W. Olms
*Attorney, Agent, or Firm*—Sughrue, Rothwell, Mion, Zinn and Macpeak

[57] ABSTRACT

A multichannel correlation receiver at an earth station is provided for determining the depolarization effects of atmospheric conditions on satellite communications. The receiver provides a first co-polarized signal and a second, relatively weak, cross-polarized signal indicative of the depolarization effects, and uses a phase locked loop demodulator to produce a noise free replica of the relatively strong co-polarized signal. This co-polarized signal is highly correlated with the second cross-polarized signal and is mixed therewith to provide a relatively noise free, narrow band signal which has a level indicative of the cross-polarization signal strength for both up-link and down-link propagation paths. The relative signal strengths are recorded on a digital storage means and provide an accurate measure of the depolarization effects of the existing atmospheric conditions. A programmable local oscillator also provides multiple channel capability.

10 Claims, 2 Drawing Figures

EARTH STATION RECEIVER

SATELLITE TRANSPONDER

MULTICHANNEL CORRELATION RECEIVER FOR DETERMINING DEPOLARIZATION OF SIGNALS ALONG SIGNAL PROPAGATION PATHS

BACKGROUND OF THE INVENTION

One of the techniques used to increase the capacity of communications satellite systems operating under bandwidth limited conditions is frequency reuse through spatial and/or polarization isolation. In systems using dual polarization the isolation between the signals in each polarization state is limited by depolarizing effects of the earth station antennas, the satellite antennas and the propagation medium. The depolarizing effects of the propagation medium, which are minely due to rain, can significantly reduce the isolation between the cross-polarized signals. There is a need for collecting propagation data to provide better understanding and statistics of rain depolarization effects, and to monitor the quality of frequency reuse satellite links. Some of the INTELSAT IV-A satellites are equipped with a dual polarization experiment which can be used to gather propagation information on the satellite links.

The usual method of collecting data on the satellite link is to send a special carrier (usually C.W. signal) at the transmit end of the link, then receive that carrier (in both polarizations) at the receive end of the link by means of conventional receivers. This method requires the allocation of certain frequency bands for the carriers to be used in collecting the data, which reduces the available frequency spectrum of the link, hence a reduction in the capacity. Furthermore, if data from more than one carrier is desired, additional receivers are needed, which increases the cost of the data gathering.

A system which tracks an undesired cross-polarization signal using a phase locked loop is described in Fletcher et al., U.S. Pat. No. 3,883,871. The object of the Fletcher et al. system is to provide automatic nulling out of any undesirable received signals having approximately orthogonal polarizations. The received cross-polarization signals are applied as inputs to a hybrid junction which produces sum and difference signals. The sum signal includes components of the undesirable received signals and is used to coherently detect and null these unwanted components from the difference signal. The carriers of the desired and the undesired signals are slightly different and the phase locked loop tracks the undesirable signal. The Fletcher et al. system, however, does not measure the relative signal levels of each polarization to determine the depolarizing effects of present atmospheric conditions.

McAuliffe, U.S. Pat. No. 3,518,680, also discusses the use of a phase locked loop circuit in conjunction with a receiver of polarized signals. The McAuliffe apparatus eliminates cross-channel interference in a quadrature transmission system and describes a correlation means which detects the correlation between the in-phase and quadrature signals received. The correlation produces an error signal which indicates the cross-channel interference. The phase locked loop, in combination with the error signal, provides a control means such that cross-channel interference can be eliminated. McAuliffe does not, however, teach the correlation between two orthogonally polarized signals to measure the depolarization effects of atmospheric conditions.

The Patent to Voght, U.S. Pat. No. 3,943,517, discusses an adaptive polarization receiver that makes the system phase angle track the orientation angle of linear polarization of a radiated carrier. The Voght system compensates for distortion caused by undesirable polarization modulation of the carrier. The receiver taught by Voght incorporates a closed loop feedback network, in which an error signal is generated whenever the system phase angle is different from the polarization angle of the received signal. The Voght system does not function as that of the subject disclosure but is cited because of the closed loop feedback servo system.

U.S. Pat. Nos. to Ruthroff (3,500,207); Amitay (3,735,266); Ohm (3,914,764); Tirro et al. (3,986,123); Soma et al. (4,090,137); Beguin et al. (4,106,015); and Powell (4,107,678) teach other types of correlation receivers for cross-polarization signal reception, but do not disclose the use of a phase locked loop demodulator.

SUMMARY OF THE INVENTION

The object of this invention is the design and the implementation of a receiver which operates on a novel principle to measure the cross-polarization isolation of angle modulated carriers. The receiver can collect data on the up-link and the down-link isolations between signals in a single or dual polarized frequency reuse satellite communication system. The subject disclosure teaches how a calculator controled receiver can collect the required data from several FM/FDM traffic carrying carriers without service interruption and without the need for transmitting special signals. The invention also provides the capability of collecting such data from a large number of carriers using a single receiver which is time shared between the carriers; thus greatly reducing the cost for data gathering from a large number of carriers. The invention also provides for the storage of the collected data in digital form on a mass storage device so that the data can be conveniently retrieved and analyzed by a computer.

Specifically, the invention provides a co-polarization signal and a cross-polarization signal indicative of the de-polarization encountered in the propagation path of the signal. Both signals are down-converted to a first intermediate frequency. The co-polarization signal is then applied to a phase locked loop demodulator which provides a noise free replica of the co-polarization signal. The cross-polarization signal is up-converted by a particular $\Delta F$ to a second intermediate frequency and mixed with the co-polarization replica signal. The resulting signal is relatively noise free, and is related to the cross-polarization signal level. This signal is then separated into first and second final signals indicative of de-polarization of the up-link and down-link signal propagation paths, respectively. Digital storage means are provided for recording the levels of the copolarization signal and the first and second final signals.

The local oscillator is programmable so as to provide a multichannel capability.

DETAILED DESCRIPTION

Figure 1:
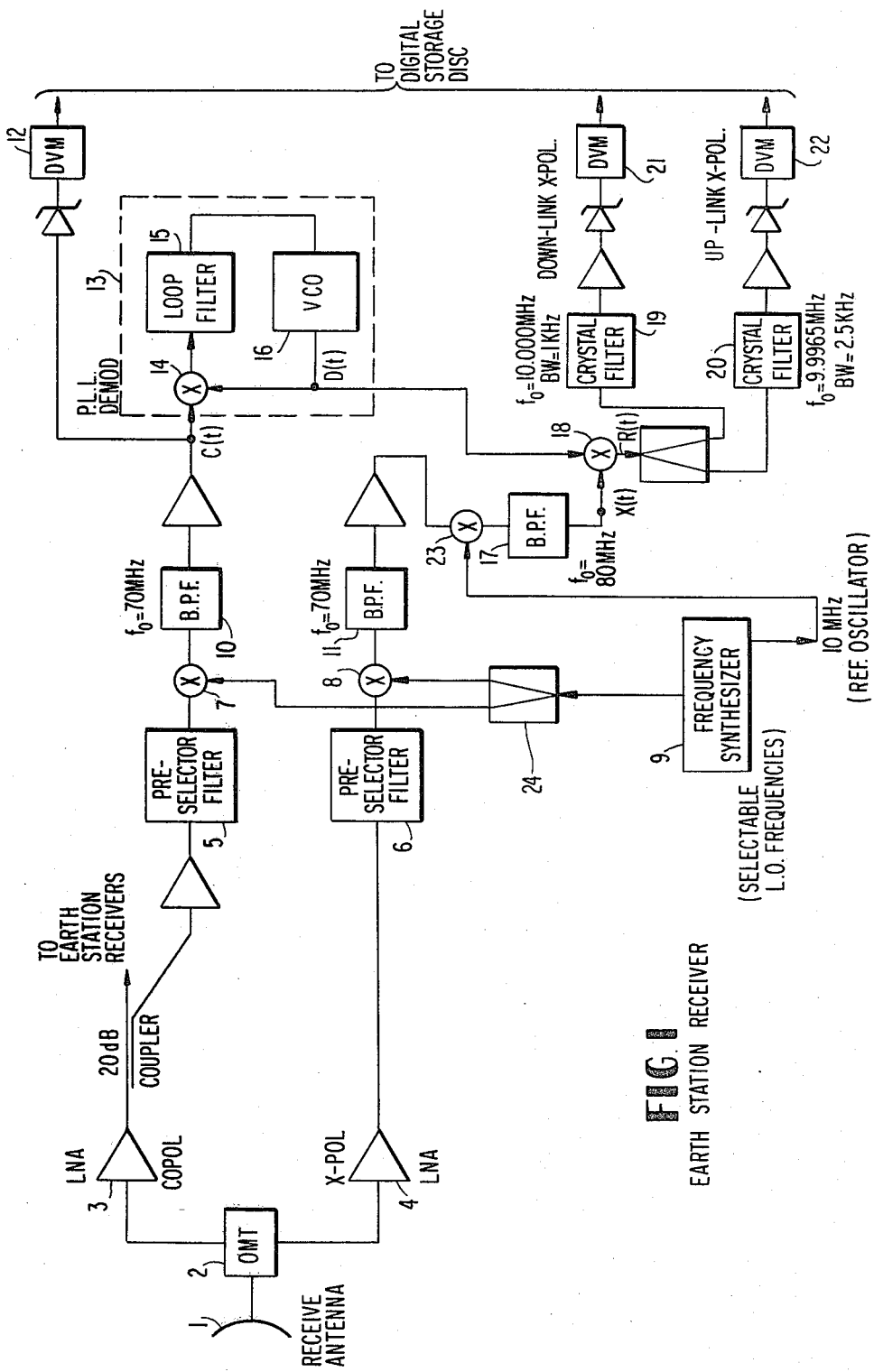
FIG. 1 shows the preferred embodiment of the Multichannel Correlation Receiver comprising the earth station receiving apparatus.

Referring to FIG. 1, the earth station multichannel correlation receiver is shown as comprising receive antenna 1 and ortho-mode transducer 2. Transducer 2 is well-known in the art and functions to separate the co-polarized and cross-polarized portions of the received signal from one another. In the preferred embodiment of the invention the co-polarized signal will be left-hand circularly polarized while the cross-polarized signal will be right-hand circularly polarized. It should be noted that these particular choices of polarizations are merely exemplary and that the particular choice of the copolarization will depend upon particular system requirements. Once the particular co-polarization signal is chosen, the only remaining requirement is that the polarization of the cross-polarization signal be orthogonal to the co-polarization signal.

The co-polarization signal is sent through low noise amplifiers 3 through an intermediate amplifier to preselector filter 5, by way of the 20 dB coupler. The main arm of the 20 dB coupler delivers the output of the low noise amplifier to the earth station receivers ancillary hereto. The cross-polarization signal is sent through low noise amplifier 4 to preselector filter 6. The output of pre-selectors 5 and 6 are down-converted in mixers 7 and 8 under the control of local oscillator 9 which comprises a programmable frequency synthesizer. The local oscillator signal is applied to mixers 7 and 8 through power divider 24. The outputs of mixers 7 and 8 are connected to identical band pass filters 10 and 11 having a center frequency of 70 MHz. The output of band pass filter 10 is further amplified and connected to, on the one hand, a diode detector and digital voltmeter 12, and on the other hand to a phase lock loop demodulator. The phase lock loop demodulator comprises mixer 14, loop filter 15, and voltage control oscillator 16, having an output D(T). The output from band pass filter 11 is further amplified and up-converted by 10 MHz in mixer 23 under the control of frequency synthesizer 9. This up-converted signal is connected to band pass filter 17 having a center frequency of 80 MHz to produce signal X(t). The signals D(t) and X(t) are mixed in mixer 18 and applied to crystal filters 19 and 20. Filter 19 is shown as having a center frequency of 10 MHz with a bandwidth of 1 KHz, while crystal filter 20 is shown as having a center frequency of 9.9965 MHz with a band width of 2.5 KHz. The outputs of filters 19 and 20 are further amplified, detected and connected to digital volt meters 21 and 22. The outputs of digital volt meters 12, 21 and 22 are each connected to digital storage means such as a disc memory.

Figure 2:
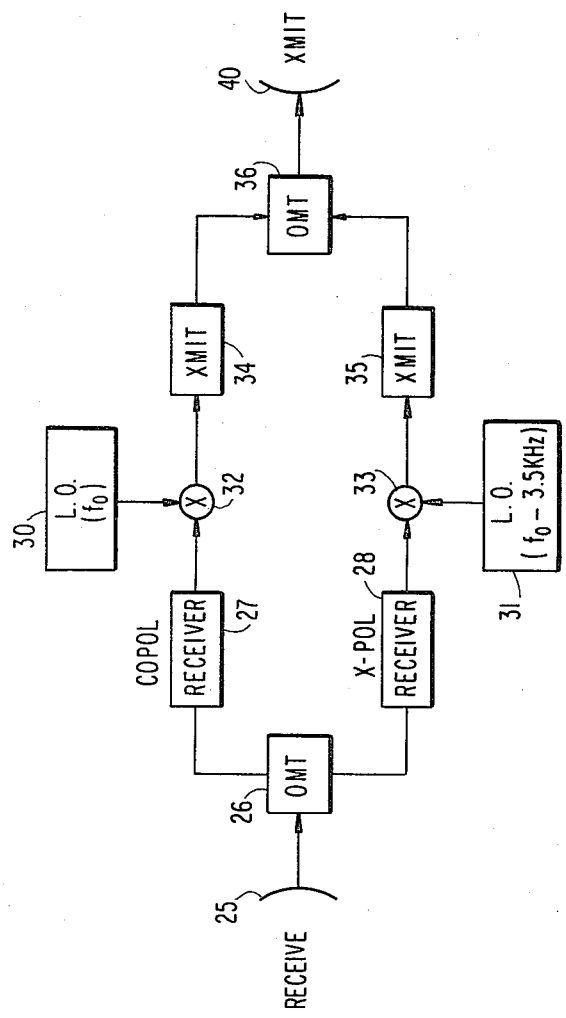
FIG. 2 is a function view of a satellite transponder which cooperates with the earth station receiver.

FIG. 2 shows a functional view of the satellite transponder which is used with the earth station receiver shown in FIG. 1. The satellite transponder of FIG. 2 comprises receive antenna 25, orthomode transducer 26 having a co-polarization output and a cross-polarization output received at means 27 and 28, respectively. The outputs of co-polarization and cross-polarization receivers 27 and 28 are connected to mixers 32 and 33 where the frequency of the received signal is translated by first and second local oscillators 30 and 31. The local oscillator 30 translates the co-polarization signal by $F_0$ while the local oscillator 31 offsets the cross-polarized signal by the same offseting frequency, $F_0$, further offset by 3.5 KHz. The two frequency offset signals are then retransmitted to the earth station by way of transmitter means 34 and 35, a second ortho-mode transducer 36 and transmit antenna 40. Note that the system of FIG. 2 could just as easily be implemented by providing two separate transponders, the first of which has an antenna which receives only a co-polarization signal, local oscillator 30, mixer 32, transmitter 34 and a separate transmitting antenna. The second transponder would obviously be provided with a second antenna which receives only cross-polarization signals, local oscillator 31, mixer 33, transmitter 35 and a second separate transmitting antenna. The alternative system just described and the system of FIG. 2 are functionally equivalent and the use of either configuration in the overall system is a matter of choice.

The operation of the multichannel correlation receiver will now be described with reference to FIGS. 1 and 2. Assuming that left-hand circular polarization is chosen as the co-polarized signal the earth station will transmit the normal left-hand circular polarized signals to the transponder in FIG. 2. The transponder will receive the signal, separate the received polarizations so that the left-hand signals are directed to receiver 27 and the right-hand signals, which are due entirely to the de-polarization effects of atmosphere conditions on the up-link portion of the signal path, are directed to cross-polarization receiver 28. The co-polarization left-hand signal is frequency shifted by $F_0$ in mixer 32 while the cross-polarization right-hand signal is frequency shifted by $F_0$—3.5 KHz in mixer 33. The signals are recombined in ortho-mode transducer 36 for retransmission back to the earth station. In the alternative embodiment described above the two separate transponders receive the left-hand and right-hand signals and shift them by $F_0$ and $F_0$—3.5 KHz, respectively, and retransmit them back to the earth station.

The earth station of FIG. 1 receives the retransmitted signals at receiving antenna 1 and separates the left-hand from the right-hand signals at transducer 2. The co-polarized left-hand signal is sent through low noise amplifier 3 and preselector filter 5 to mixer 7 while the right-hand cross-polarized signal is sent through low noise amplifier 4 and preselector filter 6 to mixer 8 whereupon both channels are down-converted in mixers under the control of programmable local oscillator 9. The filters 5 and 6 are identical and centered at 3.845 GHz with a band width of 40 MHz. These filters are provided to prevent the mixers following them from generating images of signals in neighboring transponders which may fall close to the desired signal at the IF frequency of 70 MHz.

The local oscillator is derived from a calculator controlled frequency synthesizer which is programmed to sequentially select one of six frequencies corresponding to the required local oscillator frequency to convert the carriers of the six frequencies to 70 MHz. In this manner the earth station receiver is provided with the capability of collecting propagation data from six traffic carrying carriers originated from six different earth station locations.

The IF signals are then passed through two identical band pass filters 10 and 11 centered at 70 MHz. These filters can be made switchable so that their bandwidth corresponds to the modulated carrier size of the signal being received. After filtering, the signals are then amplified and the signal C(t) provided on the co-polarization channel as shown is detected and recorded on the digital storage disc via the digital volt meter 12. The signal C(t) is also applied to a phase locked loop demodulator 13.

The cross-polarization signal from band pass filter 11, after being amplified, is up-converted by 10 MHz in mixer 23 under the control of local oscillator 9 to produce an 80 MHz IF signal. This signal is filtered at band pass filter 17 having a center frequency of 80 MHz to produce a signal X(t). The signal X(t) is then mixed with a signal from the demodulator loop D(t).

The phase lock loop demodulator provides a strong signal D(t) with a high signal to noise ratio, the signal D(t) actually being a relatively noise free replica of the signal C. Since the signal D(t) is highly correlated with the weak cross-polarized signal X(t) the spectrum of their correlated product (the output of mixer 18) will have a very narrow width. Therefore, very narrow band width filters can be used to increase significantly the signal-to-noise ratio of weak cross-polarization signals.

In order to maximize the signal-to-noise ratio of the weak cross-polarization component, the crystal filters at the demodulation output must be made as narrow as possible. However, these filters must have sufficient bandwidth so that they enclose most of the power in the spectrum of the demodulated signals at the output of mixer 18. The FM modulated signal is represented by a variable phase angle $\theta_m$, which is the time integral of the instantaneous frequency deviation, i.e., $$\theta_m = 2\pi \int_0^t f_m(x) \, dx \quad (1)$$

The instantaneous frequency deviation is controlled by the modulation wave form m(t), i.e., $$f_m(t) = \lambda m(t) \quad (2)$$

where $\lambda$ is a constant. The co-polarized and cross-polarized IF signals, of carrier frequencies 70 MHz and 80 MHz respectively, are represented by:

$$c(t) = C_o \cos(\omega_c t + \theta_m(t)) \quad (3a)$$

$$X(t) = kC_o \cos(\omega_c t + \omega_d t + \theta_m(t) + \epsilon) + n(t) \quad (3b)$$

where $-20 \log_{10} \kappa$ is the cross-polarization isolation in dB, $\omega_c = 2\pi f_c$ is the IF angular frequency ($f_c = 70$ MHz), $\omega_d = 2\pi f_d$ is the reference angular frequency shift ($f_d = 10$ MHz), $\epsilon$ is constant phase shift and n(t) is the noise Gaussian voltage in the IF bandwidth.

The phase lock loop demodulator provides a reference wave form D(t) at the output of the VCO which may be expressed as:

$$D(t) = A \cos(\omega_c t + \theta_m(t) - \phi) \quad (4)$$

where $\phi$ is the loop tracking error. (For a perfect noise-free loop $\phi = 0$.) Now the inputs to mixer 18 are X(t) and D(t) of Equations (3b) and (4), thus the lower sideband of the output from this mixer is therefore:

$$R(t) = \text{Lower Sideband of } [X(t)D(t)] = kC_o \cos(\omega_d t + \epsilon + \phi) + \nu(t) \quad (5)$$

where $\nu$ is additive Gaussian noises.

The output signal R(t) has a spectrum which is independent of the modulator waveform $f_m(t)$. Thus, it can be filtered by as narrow a filter as possible which enhances dramatically the signal ratio of the weak cross-polarized signal.

The output level of the signal R(t) is indicative of the level of the cross-polarization signal which in turn indicates the amount of depolarization of the transmitted signal along the up-link and down-link portions of the propagation path. The signal R(t) is separated and connected to filters 19 and 20. It will be recalled that the cross-polarization signal received at the transponder shown in FIG. 2 was off-set by 3.5 KHz from the co-polarization signal received at the transponder. In this manner, the depolarization information for the up-link portion of the signal propagation path is kept separate from the depolarization information for the down-link portion of the signal path. Filter 19 is provided with a center frequency of 10 MHz and a bandwidth of 1 KHz to thereby extract the down-link portion of the cross-polarization signal while filter 20 is provided with a center frequency of 10 MHz—3.5 KHz and a bandwidth of 2.5 KHz to thereby extract the up-link cross-polarization signal from the signal R(t). Each of these signals are then detected and stored on the disc memory via digital volt meters 21 and 22. The signal levels of the down-link cross-polarization signal and the up-link cross-polarization signal are subsequently compared to the level of signal C(t) in signal comparing means to thereby provide an indication of the depolarization effects of both the up-link and down-link propagation paths of the communication signals.

Various changes, additions and omissions of elements may be made in detail within the scope and spirit of the invention and it is to be understood that the invention is not limited to specific details, examples and preferred embodiments shown and described.

What is claimed is:

1. A multichannel correlation receiver comprising:
   (a) means for receiving a first signal having a first polarization;
   (b) means for receiving a second signal having a second polarization orthogonal to said first polarization, said second signal being produced by depolarization of said first signal along a first propagation path;
   (c) local oscillator means;
   (d) first and second mixers for converting said first and second signals to first and second IF signals under the control of said local oscillator;
   (e) phase locked means for providing a relatively noise-free replica of said first IF signal;
   (f) means for correlating said first IF signal replica with a signal related to said second IF signal to produce a correlated signal; and
   (g) means for providing the levels of said first IF signal and said correlated signal to thereby indicate the amount of said depolarization of said first signal along said first propagation path.

2. The receiver of claim 1 further comprising means to separate said correlated signal into a first part and a second part, wherein said means for providing provides said first part of said correlated signal to thereby indicate the amount of said depolarization along said first propagation path, and wherein said means for providing further provides said second part of said correlated signal to thereby indicate the amount of depolarization along a second propagation path.

3. The receiver of claim 2 wherein said means to separate said correlated signal comprises first and second band pass filters.

4. The receiver of claim 1 wherein said means for providing comprises:
   (a) means for detecting the levels of said first IF signal and said correlated signal;
   (b) means for converting said levels to digital formats; and (c) means for recording said digital formats.

5. The receiver of claim 4 wherein said means for receiving said first and second signals comprises:
 (a) an antenna;
 (b) an ortho-mode transducer attached to said antenna and having a pair of outputs; and
 (c) a pair of pre-selector filters each of which is connected to one of the pair of said ortho-mode transducer outputs.

6. The receiver of claims 1, 4, or 5 wherein said local oscillator means comprises a programmable frequency synthesizer providing for the selective reception of a plurality of signal sources; and wherein the outputs of said first and second mixers are connected to band pass filters.

7. The receiver of claim 1 wherein said phase locked means is a phase locked loop demodulator comprising:
 (a) a loop mixer having an input and an output;
 (b) a loop filter having an output and an input connected to said loop mixer output;
 (c) a voltage-controlled oscillator having an input connected to said loop filter output and an output connected to said loop mixer input, whereby said noise-free replica is provided at said voltage-controlled oscillator output.

8. The receiver of claim 7 wherein said first IF signal is provided at said loop mixer input.

9. The process of determining the amount of depolarization of a particular signal propagation path comprising the steps of:
 (a) receiving a first polarized signal from the propagation path;
 (b) receiving a second polarized signal from the propagation path further providing that the first polarized signal is orthogonal to the second polarized signal and that the second polarized signal is indicative of the depolarization occurring on said propagation path;
 (c) producing a relatively noise free replica of said first polarized signal;
 (d) correlating said replica and second polarized signal to produce a correlated signal; and
 (e) comparing said correlated signal with said first polarized signal.

10. The process of claim 9 wherein said step of producing the replica comprises the step of phase locked demodulation of said first polarization signal.

* * * * *